United States Patent
Leung

(10) Patent No.: US 6,358,415 B1
(45) Date of Patent: Mar. 19, 2002

(54) VORTEX SEWAGE DISPOSAL APPARATUS

(76) Inventor: Wai On Leung, 1 Floor No. 17 Fui Yiu Ha Chuen, Shatin, N.T. (HK)

(*) Notice: Subject to any disclaimer, the term of this patent is extended or adjusted under 35 U.S.C. 154(b) by 0 days.

(21) Appl. No.: 09/448,016

(22) Filed: Nov. 23, 1999

(30) Foreign Application Priority Data

Nov. 24, 1998 (CN) .......................................... 98 1 22685

(51) Int. Cl.⁷ .............................. C02F 1/38; C02F 1/52; C02F 9/00; B01D 21/01; B01D 21/26
(52) U.S. Cl. ...................... 210/205; 210/206; 210/207; 210/199; 210/201; 210/202; 210/294; 210/322; 210/512.1; 210/521; 210/523; 210/738; 366/337; 366/338
(58) Field of Search ................................ 210/738, 205, 210/206, 207, 208, 512.1, 521, 523, 322, 294, 199, 201, 202

(56) References Cited

U.S. PATENT DOCUMENTS

| | | | |
|---|---|---|---|
| 1,951,647 A | * | 3/1934 | Cooke |
| 3,886,073 A | * | 5/1975 | Briltz |
| 4,470,907 A | * | 9/1984 | Sencza |
| 4,511,258 A | * | 4/1985 | Federighi et al. |
| 5,124,035 A | * | 6/1992 | Dunne et al. |
| 5,340,477 A | | 8/1994 | Simon |
| 5,851,396 A | * | 12/1998 | Saget |

FOREIGN PATENT DOCUMENTS

| | | |
|---|---|---|
| CN | 1038943 A | 1/1990 |
| CN | 2218592 A | 1/1996 |
| EP | A-196644 | 10/1986 |
| SU | 1691313 A1 | 11/1991 |
| WO | WO95/07125 | 3/1995 |

* cited by examiner

*Primary Examiner*—Thomas M. Lithgow
(74) *Attorney, Agent, or Firm*—Knobbe, Martens, Olson & Bear, LLP

(57) ABSTRACT

A vortex sewage disposal apparatus for the disposal of construction sewage, comprising a hopper-type casing, a water inlet pipe, a lower outlet and a frame; within the water inlet pipe these are provided rapid-mixing blades, on the wall of the inlet pipe there are provided an upper and a lower reagent-filling holes used to add two treatment reagents successively, at the center of the hopper casing there is provided a central tube, at the lower end of the central tube there is mounted a conical separator, and inside the central tube there is provided a screw-type water lifter; on the top of the hopper casing there is provided a top baffle plate acting as an upper cover; a bleed pipe is provided for discharging oil and gas, the silt is discharged through the lower outlet, and the clear water ascents to a clear water tank and a water-directing tray and then flows into a water discharging pipe after crossing a dam board to be discharged.

14 Claims, 5 Drawing Sheets

MOUNTING OF VORTEX

VORTEX SEWAGE DISPOSAL APPARATUS

FIELD OF THE INVENTION

The invention relates to a sewage disposal apparatus, and particularly to a vortex sewage disposal apparatus for the disposal of sewage at construction sites.

BACKGROUND OF THE INVENTION

At construction sites such as those for tunnel drilling and exploration, civil construction, foundation piling, building construction, mining area, cement mills, civil engineering, or associated engineering projects, there are produced a large amount of so called construction site sewage in which a large amount of silt and spall, as well as industrial greasy dirt, are entrained. If the sewage is discharged directly to water channels, it will cause severe silting-up; and the conventional sedimentation tanks are no longer adapted to the required environment protection standards. For building and capital construction, there is a great need of a sewage disposal apparatus which is simple in structure, low in cost, small in volume and easy to operate. The sewage disposal apparatuses previously used are of a hopper-type, after the entry of the sewage in a plane above the hopper, the sewage is rotated by blades mounted on a central axle driven by a motor to cause the silt solids to spiral down and discharged from the bottom of the hopper casing, while the oily water or clean water is thrown out in the same plane. However, this type of disposal apparatuses can not obtain ideal effect, thus can not meet the increasingly upgraded environment protection needs. Therefore, there is a great need for a construction sewage disposal apparatus which is power-saving, simple in structure, less expensive, easy to operate and use, can achieve a higher degree of separation of oily water and silt with more oxygen content in the treated water.

SUMMARY OF THE INVENTION

The object of the present invention is to provide a vortex sewage disposal apparatus with no motor, it is capable of separating oil, water and silt, with both the separation effect and the oxygen content in water surpassing the minimum requirement required by environment protection.

To achieve the object of the present invention, there is provided a vortex sewage disposal apparatus mainly for the disposal of construction site sewage, mainly comprising: a hopper casing and a frame, on the hopper casing there is mounted a water inlet pipe, and at the lower end of the casing there is provided a lower outlet; inside the water inlet pipe there are provided rapid-mixing blades, a lower reagent-filling hole is formed on the wall of the inlet pipe on the side of the water inlet, the inlet pipe is connected with the hopper casing through an elbow, and on the elbow there is formed an upper reagent-filling hole; at the center of said hopper casing there is provided a central tube extending along the central axis, inside the central tube there is provided a screw water lifter and at the lower end of the central tube there is mounted a conical separator; on the top of said hopper casing there is provided a top baffle plate acting as an upper cover to seal the untreated water, the top baffle plate is provided with an air bleed pipe; the central tube extends through the top baffle plate, on top the baffle plate there is mounted a clear water tank, the clear water tank has a water tray extending beyond the hopper casing, the water tray is provided with a discharging pipe.

The advantages of the apparatus of the present invention lie in that it ensures that the disposed sewage meets the requirements of environment protection standards, and the apparatus does not need a motor, and is simple in structure and is convenient to operate.

BRIEF DESCRIPTION OF THE DRAWINGS

The embodiments of the present invention will be described below in connection with accompanying drawings in which.

DETAILED DESCRIPTION OF THE PREFERRED EMBODIMENTS

Figure 1:
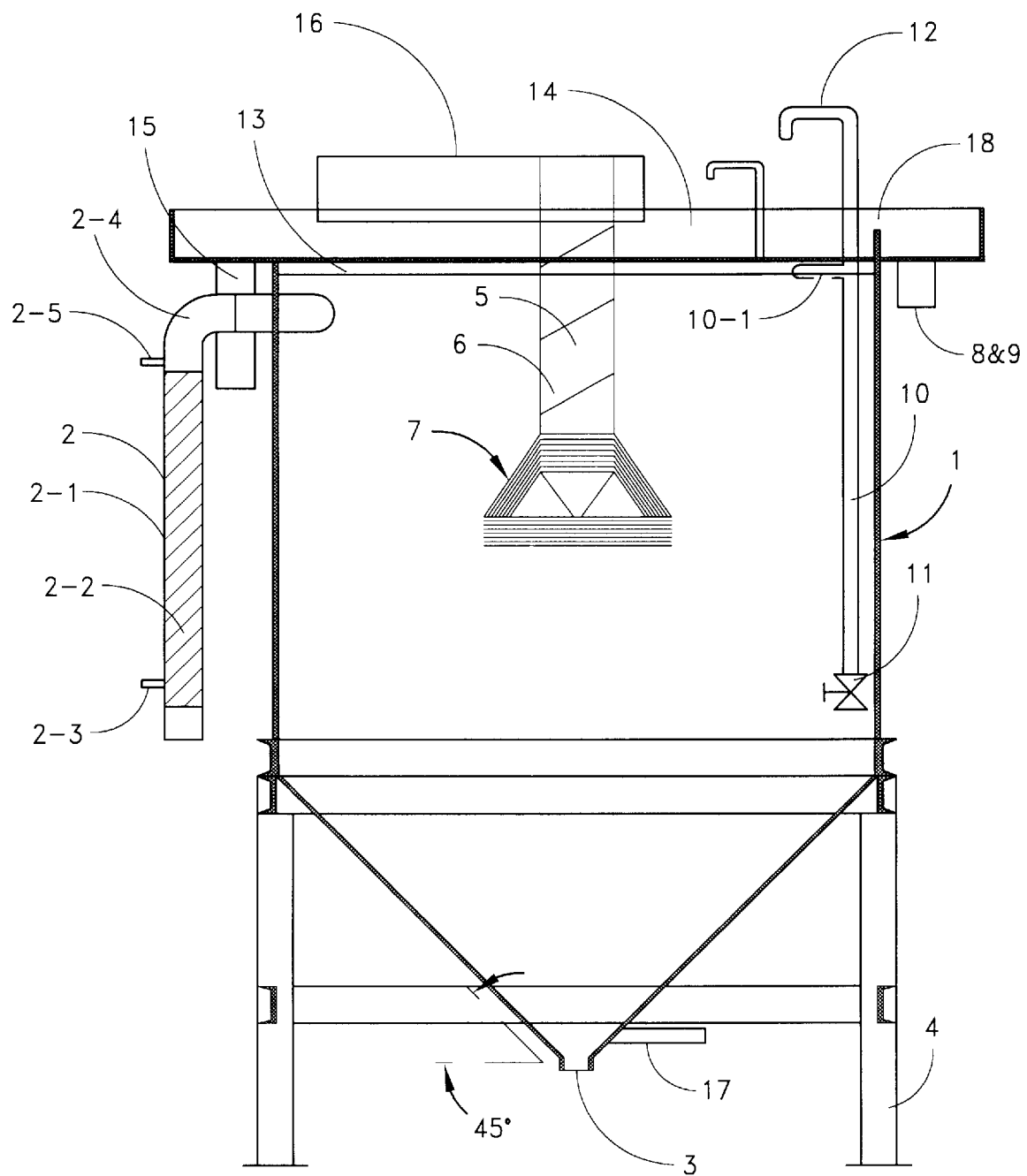
FIG. 1 is a schematic view showing the structure of an embodiment of the vortex sewage disposal apparatus according to the invention.

FIG. 1 is a sectional view of an embodiment of the vortex sewage disposal apparatus of the invention, and is used for illustrating the structure and the mutual position relationship of components of the apparatus. The vortex sewage disposal apparatus comprises a hopper-type casing 1, the upper portion of the casing 1 is of a hollow cylindrical configuration and the lower portion has is of a hopper configuration. On the left-hand side of the figure is a water inlet pipe 2 which is mounted on the casing, at the lower end of hopper casing 1 there is provided a lower outlet 3. The hopper casing 1 is mounted on a frame 4.

Inside the wall 2-1 of the water inlet pipe 2 these are provided rapid-mixing blades 2-2, a lower reagent-filling hole 2-3 is provided on the wall 2-1 at the side of the water inlet, the wall 2-1 is connected with the hopper casing 1 through a elbow 2-4, and on the elbow 2-4 there is provided an upper reagent-filling hole 2-5.

At the center of the hopper casing 1 there is provided a central tube 5 along its central axis, inside the central tube 5 there is provided a screw water lifter, and a conical separator 7 is provided at the lower end of the central tube 5.

An oil outlet pipe 10, which is on the right-hand side in FIG. 1, can be additionally provided along the inner wall of the hopper casing 1, at the lower end of the oil outlet pipe 10 there is provided a valve 11.

On the top of the hopper casing 1 is a top baffle plate 13 acting as an upper cover to seal the untreated water, the central tube 5 extends through the top baffle plate 13, on the top of the baffle plate 13 there is provided a clean water tank 14. The clean water tank 14 has two water trays extending beyond the hopper casing 1, one of the two water trays is provided with one or more discharging pipe(s) 8, and in the case of two discharging pipes, the two discharging pipes 8-1 and 8-2 are positioned on the left and right sides respectively. The total cross-sectional area of the discharging pipe(s) 8 is larger than and preferably more than two times that of the water inlet pipe 2 to facilitate the entry of the air into the water already treated so as to increase the oxygen content in the water. In order to further clear the water arriving at the clear water tank, between the water tray provided with the discharging pipe 8 and the water-containing body of the clear water tank 14 there is provided a dam board 18 or a silt darn board, the height of the dam board 18 can be about a half of that of the clear water tank 14. The treated water, after arrival at the clear water tank 14, can not flow to the outlet 8 until it crosses darn board 18. The darn board 18 causes the silt to further settle in the clear water tank 14. At a suitable position on the bottom of the other water tray of the clear water tank 14 there is provided silt-discharging pipe 15 provided with a value, the pipe 15 being used to discharge the sludge deposited on the bottom of the clear water tank 14. On the upper right side in FIG. 1 there is shown an air bleed pipe 12 which is installed in a hole in the baffle plate 13. At the top of the central tube 5 there is provided a rectangular water-directing tray 16 to direct the water to the clear water tank 14.

The untreated sewage is pumped into the water inlet pipe 2, and reagents are filled into the water inlet pipe from the lower reagent-filling bole 2-3 and the upper reagent-filling hole 2-5 respectively to mix with the sewage. The sewage is accelerated by the rapid-mixing blades 2-2 in the water inlet pipe 2 and mixes immediately with the reagents filled successively. The sewage already mixed enters the upper portion of hopper casing 1 in the tangential direction of the inner circumferential wall of the hopper casing 1 and is forced to circle circumferentially in the cylindrical shell of the hopper casing 1, and approach gradually to the central axis; during circulation, due to the gravity and the action of the reagents, the oil, silt and spall are separated rapidly. The larger silt and spall thus formed descents rapidly to the lower outlet 3 to be discharged to the outside, while the oil goes up rapidly to the underside of the top baffle plate 13, the air and the oil are discharged to the outside through the bleed pipe 12. In the case that the oil outlet pipe 10 is provided, the oil enters the oil outlet pipe 10 and is discharged therethrough to the outside. The water that entrains finer particulate enters the conical separator 7 of multiple layers, and due to the division and separation actions produced by the rotation of slanted plates, the particulate descend to the lower outlet 3 while the water is pushed back upwards under the action of the cone shape of conical separator 7, causing all the clear water already treated to ascend through the central tube 5 under the propelling action of the helical blade. The clear water takes relatively longer time to get to the discharging pipe 8 by passing through the water-directing tray 16, resulting in a longer period of purification time and causing the clear water to be purified and settled once again in the clear water tank 14 on the hopper casing 1. The dam board 18 permits only the clear water already purified to enter the discharging pipe 8, while the turbid water on the bottom of the tank 14 remains in the clear water tank 14. And finally, the clear water is discharged to the outside through the left and right discharging pipes 8-1 and 8-2. The top end of the central tube 5 is slightly higher than that of the tank for the purpose of increasing the hydraulic pressure.

The Conical separator 7 is composed of two or more connected conical or umbrella steel sheets (with an inclination of 55degrees) which are stacked one on top of the other. When the water and the silt circle here, the water ascents and the silt descents when colliding against the conical wall; multiple layers of conical walls allow the fine particulate to fall down after being deviated and decelerated, the number of the layers of the conical steel sheets has effect on the quality of the water discharged, and the more the conical steel sheets, the better the purification quality of the water.

When the oil outlet pipe 10 is provided, at its upper portion there is connected a short oil inlet pipe 10-1 which is horizontally positioned immediately under the top baffle plate 13 to facilitate the oil already separated to enter the outlet pipe 10 to be discharged.

The reagent filled through the lower reagent-filling hole 2-3 is a high polymer flocculating agent, and the reagent filled through the upper reagent-filling hole 2-5 is a polymerized aluminum chloride. By adding these two chemical agents, the water and the silt can be separated efficiently, and with the chemicals being added at different positions, the sewage is caused to contact the high polymer flocculating agent first and then the polymerized aluminum chloride, a better treatment effect is achieved. The external addition of chemical reagents at two stages also constitutes one of the significant features of the sewage disposal apparatus. The inlet pipe 2 is arranged vertically so as to facilitate the mixing, and the manner of the arrangement of the internal blades can prevent sand, spall and sludge from building-up.

It is also one of the significant features of the sewage disposal apparatus to use two discharging pipes or one discharging pipe with a super large diameter, such an arrangement makes the cross-sectional area of the water outlet two times as large as that of the water inlet, therefore air can be brought in and oxygen can dissolve into the discharged water to meet the requirements of water purification.

The air bleed pipe 12 can be used to discharge gas and oil to prevent high pressure from being established in the casing 1, and also serves as a safety device; the oil outlet pipe 10 also function as such, it can be used to discharge gas and oil from the top and additionally it can discharge oil from the bottom by opening the valve 11.

Sediment will build up in the clear water tank 14 after a long period of use of the vortex sewage disposal apparatus, and the silt-discharging port 15 is thus provided to remove the sediment. In order to clean the lower outlet 3, a silt-removing pipe 17 with a valve is provided at a position a little above the lower outlet 3, the cleaning water can enters the pipe 17 to help discharge the sludge.

Figure 2:
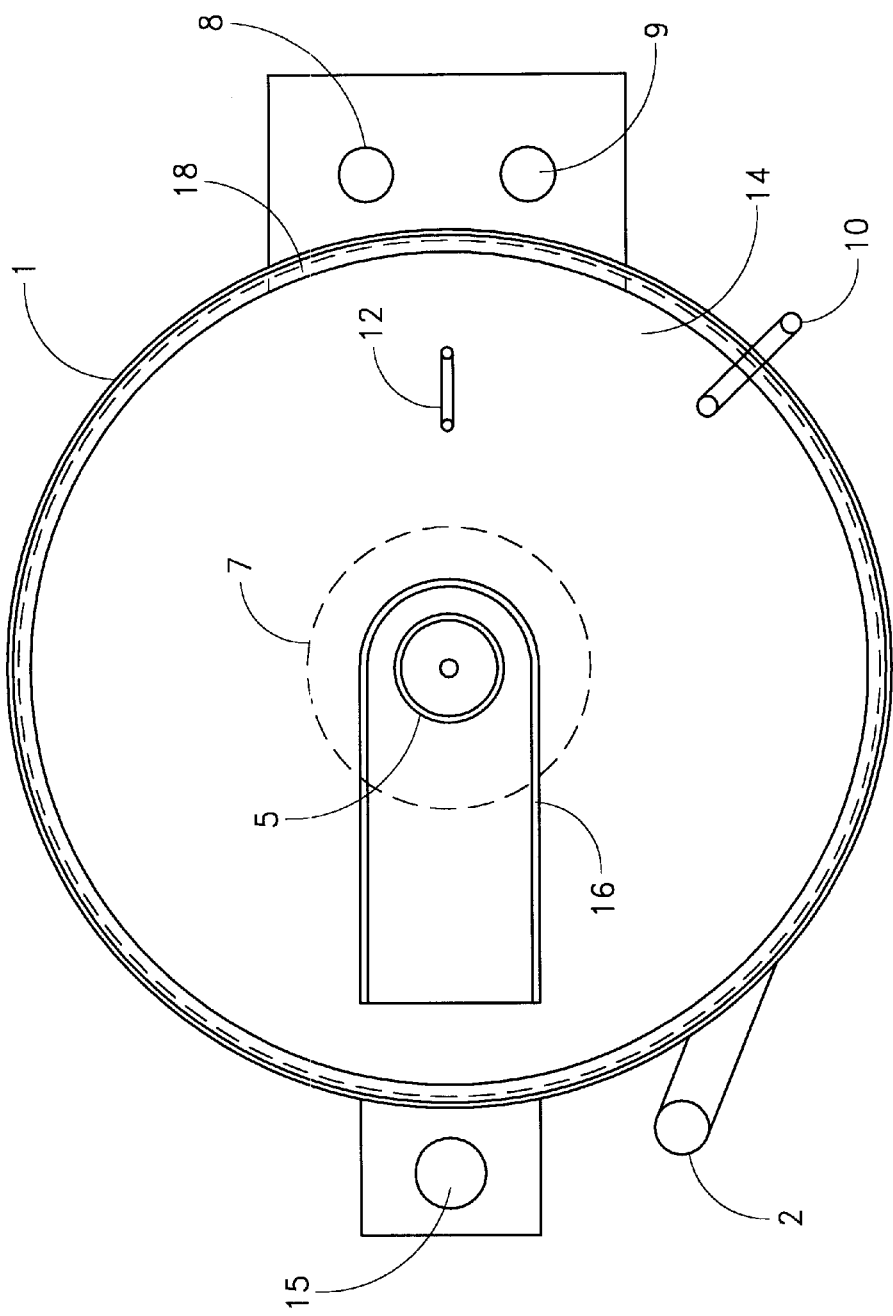
FIG. 2 is the top view of the vortex sewage disposal apparatus shown in FIG. 1.

Referring to FIG. 2 which shows the vortex sewage disposal apparatus of the present invention in top view, there can be seen the arrangement and relative positions of the components. The hopper casing 1 is round in shape; the water inlet pipe 2 injects the sewage into the casing in a tangential direction of the inner circumferential wall of the of hopper casing 1; the central tube 5 is located at the center; the conical separator 7 is shown by broken line; the water-directing tray 16 directs the water to the clear water tank 14; on the right-hand side of the clear water tank 14 on the top is the water tray extending beyond the hopper casing 1, and under the water tray there are provided the left discharging pipe 8-1 and the right discharging pipe 8-2; between the body of the clear water tank 14 and the discharging pipe 8 there is provided the dam board 18; on the left-hand side of clear water tank 14 is the other water extending beyond the hopper casing 1, and under the water tray there is provided the silt-discharging port 15. And also shown in the figure are the outlet positions of the air bleed pipe 12 and oil outlet pipe 10.

Figure 3:
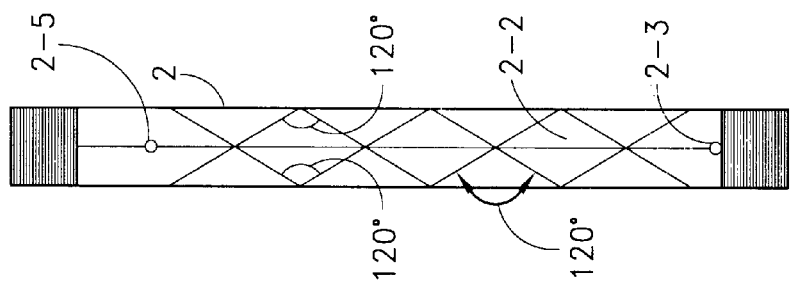
FIG. 3 is a view illustrating the arrangement of the blades in a water inlet pipe of the vortex sewage disposal apparatus shown in FIG. 1.

Referring to FIG. 3 which shows the arrangement of the rapid-mixing blades 2-2 in the water inlet pipe 2 of the present invention. There are provided altogether eight blades, the angle between the adjacent blades is 120 degrees. The sewage enters from blow. The number of rapid-mixing blades can be at least two, or four or more, and eight is used in the embodiment.

Figure 4:
FIG. 4 is a schematic view showing the shape of blades in FIG. 3.

Referring to FIG. 4 which shows the shape of the rapid-mixing blades 2-2 of the embodiment of the present invention, the thin sheet blade is arcuate in shape and can be made of metal to have enough strength and wear-resistance, of course, other similar shapes and materials can also be used. The thin sheet blades of arcuate shape are like knife blades, their slant arrangement allows them to rotate when the sewage enters so as to have the function of impelling mixture to mix the chemical firstly added with the sewage.

Figure 5:
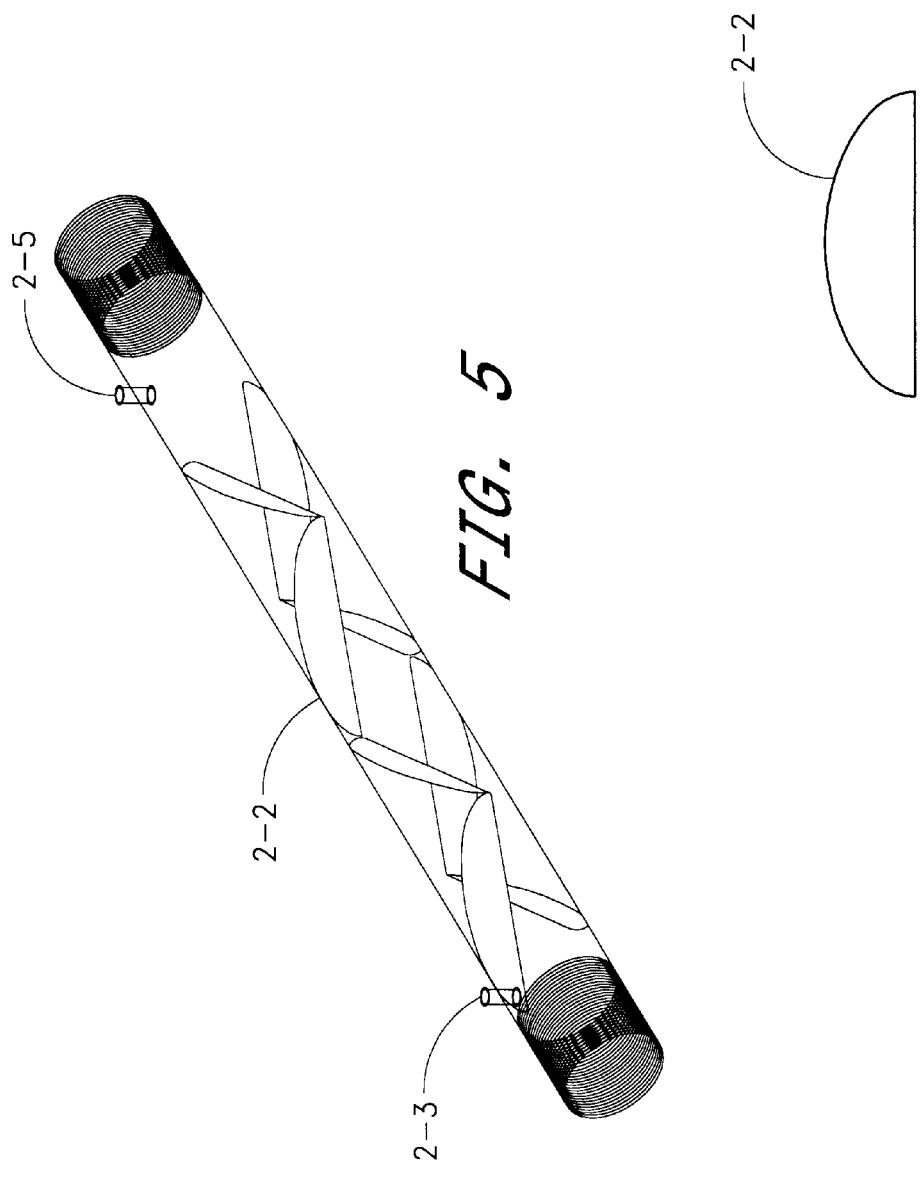
FIG. 5 is a view showing the water flow condition in the water inlet pipe of the vortex sewage disposal apparatus shown in FIG. 1.

Referring to FIG. 5 which shows the water flow condition in the water inlet pipe 2 when the sewage is pumped into the pipe 2, as vividly shown in this figure, after the sewage is pumped into the water inlet pipe 2, the sewage is caused to advance due to the rapid-mixing blades 2-2.

Figure 6:
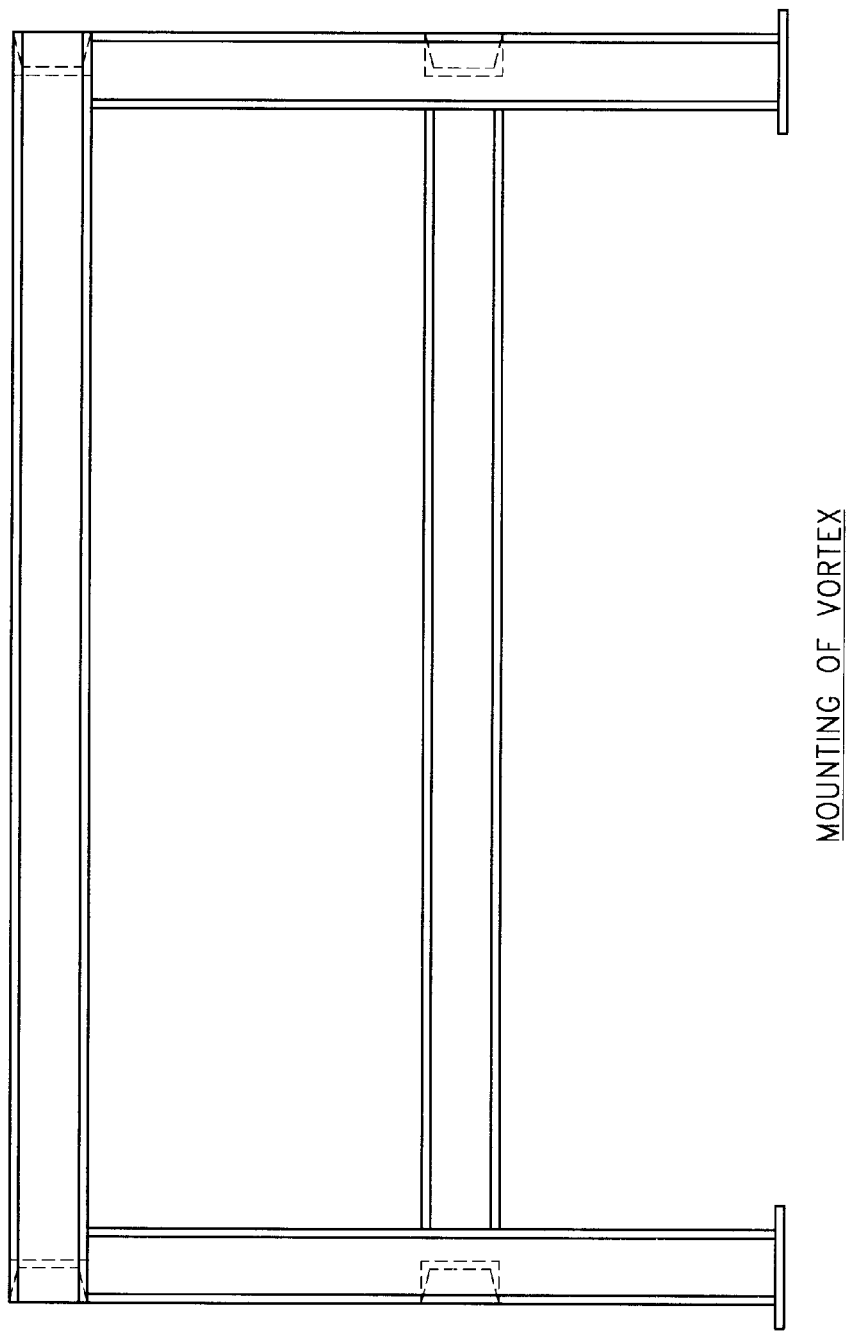
FIG. 6 is a schematic view showing the structure of a frame in the vortex sewage disposal apparatus shown in FIG. 1.

FIG. 6 a schematic view showing an embodiment of the frame 4 of the present invention, the frame is of a round skeleton structure and can be made by welding channel beam or U-beam, with the hopper casing 1 seated on it.

Figure 7A:
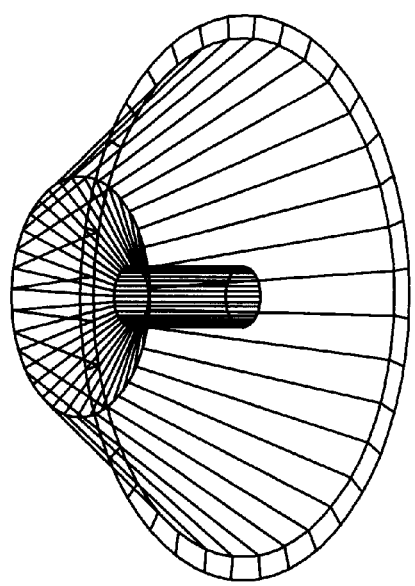
FIGS. 7A–7C are schematic views showing the structure of a conical separator in the vortex sewage disposal apparatus shown in FIG. 1.
Figure 7B:
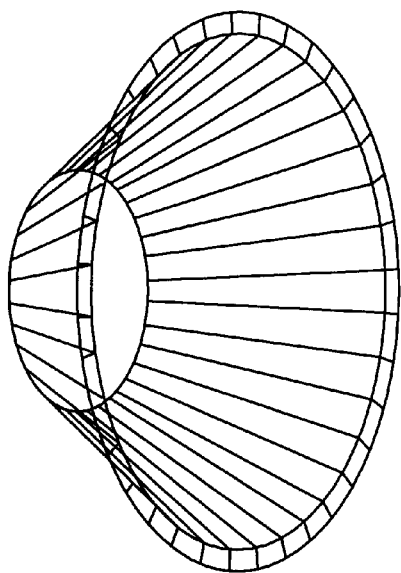
Figure 7C:
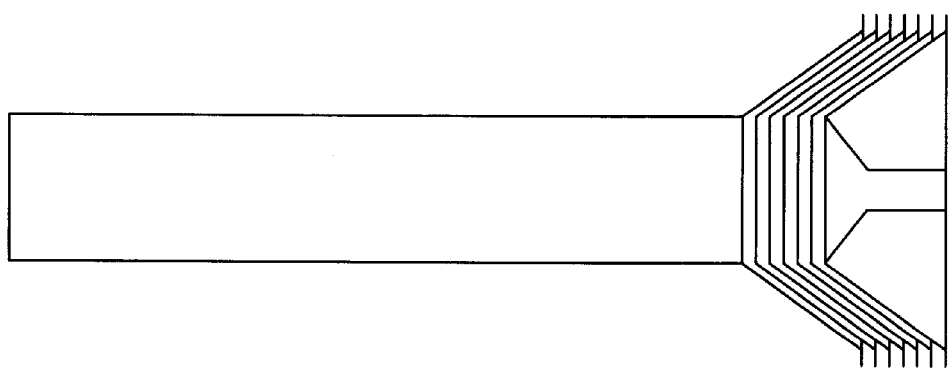

Referring to FIGS. 7A to 7C which are schematic views showing the structure of an embodiment of the conical separator 7 of the invention, the conical separator 7 is composed of two or more conical or umbrella steel mesh sheets which are stacked one on top of the other and connected to each other. The mesh sheet shown in FIG. 7A is the lowest one, it has a concave central portion which looks like a crater, along the central axis there is a cylindrical mesh tube, the outer umbrella steel mesh is its main part, and at the foot there is a flat annular flange. The mesh sheet shown in FIG. 7B is an upper one, unlike that shown in FIG. 7A, it has only the outer steel mesh and the annular flange, and it is placed over the mesh sheet shown in FIG. 7A. A plurality of mesh sheets as shown in FIG. 7B can be stacked one on top of the other and then mounted to the lower end of the central tube 5. FIG. 7C shows a separator 7 with seven sheets stacked one on top of the other and connected to each other. FIGS. 7A to FIG. 7C further clearly illustrate the structure of the conical separator 7 in detail, by which the desired reflection and deposition functions can be achieved.

A particular embodiment of the present invention has been described hereinabove. To have a concept of the dimensions of the, based on FIGS. 1 to 6, the specific sizes of the main components is given out here as an example: the vortex sewage disposal apparatus has a total height of about 4 m; the outer diameter of the upper portion of the hopper casing 1 is about 2.44 m, and the height is about 2.3 m; the height of the lower portion is about 0.74 m; the generating line of the conical hopper lower portion forms an angle of about 45 degrees with a horizontal plane; the hole diameter of water inlet pipe 2 is 0.15 m; the diameter of the central tube 5 is about 0.3 m, the height of the central tube 5 is about 1 m; the size of the upper part of the conical separator 7 is about the same as the diameter of the central tube 5, the outer diameter of the lower part of the conical separator 7 is 0.76 m, and the height of the come is about 0.46 m. These are the sizes of the main components, and other sizes can be correspondingly determined from the figures and by experience.

The vortex sewage disposal apparatus of the invention is simple in structure, easy to operate, and it does not need power and can achieve desirable effect. With the apparatus of the invention, the sewage at construction sites can be well purified to meet the requirements of environment protection. The present invention is an excellent new choice of the sewage disposal apparatuses at construction sites.

What is claimed is:

1. A vortex sewage disposal apparatus, comprising:
    a hopper casing on which there is mounted a water inlet pipe, and at the lower end of the casing there is provided a lower outlet;
    a frame;
    wherein inside the water inlet pipe there are provided rapid-mixing blades, a lower reagent-filling hole is formed on the wall of the inlet pipe on the side of the water inlet, the inlet pipe is connected with the hopper casing through an elbow, and on the elbow there is formed an upper reagent-filling hole; at the center of said hopper casing there is provided a central tube extending along the central axis, inside the central tube there is provided a screw water lifter and at the lower end of the central tube there is mounted a conical separator; on the top of said hopper casing there is provided a top baffle plate acting as an upper cover to seal the untreated water, the top baffle plate is provided with an air bleed pipe; the central tube extends through the top baffle plate, on top the baffle plate there is mounted a clear water tank, the clear water tank has a water tray extending beyond the hopper casing, the water tray is provided with a discharging pipe.

2. The vortex sewage disposal apparatus of claim 1, wherein along the inner wall of said hopper casing there is provided an oil outlet pipe, and at the lower end of the oil outlet pipe there is provided a valve.

3. The vortex sewage disposal apparatus of claim 1, wherein the rapid-mixing blades inside said water inlet pipe are arcuate, thin sheet blades and are placed upstandingly.

4. The vortex sewage disposal apparatus of claim 1, wherein the rapid-mixing blades inside water inlet pipe comprise two or more blades, the angel between the adjacent blades is 120 degrees.

5. The vortex sewage disposal apparatus of claim 1, wherein said conical separator is composed of two or more conical or umbrella steel sheets stacked one on top of the other and connected together.

6. The vortex sewage disposal apparatus of claim 1, wherein at the upper portion of the oil outlet pipe there is connected a short oil inlet pipe, the short oil inlet pipe is horizontally positioned and located immediately under said top baffle plate.

7. The vortex sewage disposal apparatus of claim 1, wherein the discharging pipe comprises two or more outlet pipes, the total cross-sectional area of the water outlet pipes being larger than that of the water inlet pipe.

8. The vortex sewage disposal apparatus of claim 1, wherein the reagent filled through the lower reagent-filling hole is high polymer flocculating agent.

9. The vortex sewage disposal apparatus of claim 1, wherein a reagent is provided through the upper reagent-filling hole, is the reagent comprising polymerized aluminum fluoride.

10. The vortex sewage disposal apparatus of claim 1, wherein the apparatus has a total height of about 4 m; the hopper casing having an outer diameter of an upper portion of about 2.4 m and a height is about 2.3 m, and a height of a lower portion of about 0.7 m, and wherein a generating line of the lower hopper forms an angle of about 45 degrees with a horizontal plane; the hole diameter of said water inlet pipe being about 0.15 m, a diameter of the central tube being about 0.3 m and a height of the tube being about 1 m; the outer diameter of a bottom of said conical separator being about 0.76 m, and a height of a cone on the conical separator is about 0.46 m.

11. The vortex sewage disposal apparatus of claim 1, wherein said clear water tank has two water trays extending beyond the hopper casing, one of the water trays being separated from the clear water tank by a dam board provided therebetween, said one water tray being provided with the discharging pipe, and the other water tray being provided with a silt-discharging pipe at its bottom.

12. The vortex sewage disposal apparatus of claim 1, wherein the height of said dam board is about a half of that of the clear water tank.

13. The vortex sewage disposal apparatus of claim 11, wherein the height of said dam board is about half of that of the clear water tank.

14. The vortex sewage disposal apparatus of claim 1, further comprising a water-directing tray which is provided above said top baffle plate.

* * * * *